United States Patent [19]
Furuuchi et al.

[11] 3,756,196
[45] Sept. 4, 1973

[54] METHOD OF COATING GLASS SURFACES

[75] Inventors: Shigemasa Furuuchi, Yokohama;
Kazuyuki Akeyoshi, Yamato;
Yasuharu Okajima; Yoshio Gotoh,
both of Yokohama, all of Japan

[73] Assignee: Asahi Glass Co., Ltd., Tokyo, Japan

[22] Filed: July 14, 1971

[21] Appl. No.: 162,587

Related U.S. Application Data

[62] Division of Ser. No. 849,967, Aug. 14, 1969, abandoned.

[30] Foreign Application Priority Data
Aug. 22, 1968  Japan.................................. 43/59529

[52] U.S. Cl.............. 118/401, 118/DIG. 2, 118/238
[51] Int. Cl. ............................ B05c 1/08, B05c 3/00
[58] Field of Search.................... 118/211, 238, 241,
118/401, 410, 411, DIG. 2

[56] References Cited
UNITED STATES PATENTS
3,526,535  9/1970  Plumat.......................... 118/DIG. 2
3,516,387  6/1970  Windsor............................. 118/238
2,553,592  5/1951  Kucklinsky ........................ 118/211

*Primary Examiner*—Henry S. Jaudon
*Attorney*—Kurt Kelman

[57] ABSTRACT

An apparatus for producing a uniform film of a coating liquid on a surface of a glass article, especially on a surface of a flat sheet or plate glass, in which the coating liquid is maintained in the form of a meniscus between the glass surface and a rod-shaped coating element so that the meniscus moves along the glass surface to produce the desired film thereon. The rod-shaped coating element is disposed at a small distance from the glass surface and is so arranged that the coating element be moved relatively to and in parallel with said surface. The coating liquid is, for example, a solution of metal compounds, and the film so produced is then dried and fired.

6 Claims, 14 Drawing Figures

PATENTED SEP 4 1973 3,756,196

METHOD OF COATING GLASS SURFACES

REFERENCE TO COPENDING APPLICATION

This is a division of our copending application Ser. No. 849,967, filed Aug. 14, 1969 now abandoned.

BACKGROUND OF THE INVENTION

1. Field of the Invention

This invention relates to an apparatus for coating the surfaces of articles of glass. More particularly, it relates to an apparatus whereby a uniform film of a liquid or of a liquid composition is formed on a flat or curved surface of plate or sheet glass.

2. Description of Prior Art

A number of coating methods have heretofore been practiced for the purpose of producing films with various properties, such as electroconductive films, colored films, light-absorbing or light-reflecting films, protective films, etc., on the surfaces of sheets, plates or other shaped articles of glass. Among the known methods, mention may be made of vacuum deposition, spattering, spraying, dipping and painting to name but a few representative ones.

Those methods, however, are not necessarily useful when a highly even film of a liquid is to be formed on a glass surface. The conventional methods are not suitable either, when it is desired to apply such a film to one surface of a glass product or to a selected area of the surface.

SUMMARY OF THE INVENTION

It is an object of the invention to provide a new method and apparatus for coating a glass surface with a liquid or a liquid composition, wherein and whereby a uniform film may be formed on the glass surface.

Another object of the invention is to provide an apparatus whereby a film may be formed from a liquid on a selected area of the glass surface. It is still another object of the invention to provide a method and apparatus whereby a multilayered film or a patterned film may be easily formed on a glass surface.

A principal feature of the invention is that the coating liquid is held in a gap or space defined by the rod-shaped coating element and glass surface in the form of a meniscus as formed by the surface tension of said coating liquid so that the meniscus is caused to move along the glass surface in correspondence with the relative movement of said glass surface and coating element. In this arrangement, by the shearing force acting upon the meniscus, the coating liquid is dispensed in small installments from the meniscus evenly onto the area of glass surface behind the meniscus so as to produce a uniform film over glass surface.

This invention, as will hereinafter be shown, is particularly beneficial in applications where glass surfaces are coated with aqueous or organic solutions containing metallic compounds which are employed when it is desired to fire colored films or light-absorbing or -reflecting films on glass surfaces. Aside from those applications, the invention can also be embodied to advantage for the formation of an electroconductive film, for coating glass with frit or paint, or for coating glass with various liquids or liquid compositions in general.

The coating element to be employed according to the invention is a member which is constructed in the manner of a rod or roller and adapted to retain a coating liquid in the form of a meniscus in the gap defined by the surface of glass to be coated and the liquid. It may generally be a round straight bar, but can be constructed in the form of a bent round bar or a bar-like longitudinal element with some other cross-sectional shape such as parabolical or elliptical shape. The term "glass surface" or "the surface of glass" as used throughout the specification and the claims appended thereto means, unless otherwise stated, one of the surfaces of a flat or curved glass sheet or plate. However, the invention is applicable as well for the coating of the flat or curved surfaces of glass products other than sheet and plate glass.

The coating apparatus according to this invention, consists, essentially, of a carriage on which a glass sheet to be coated is to rest, a track-way along with said carriage is arranged to slide, a drive unit operatively associated with said carriage so as to cause the carriage to slide along said track-way, a rod-like coating element disposed at a small distance from the upper surface of the glass sheet resting on said carriage and in substantially parallel relation with respect to said upper surface, and a liquid-supply means adapted to feed a coating liquid into the gap defined by the coating element and glass surface so as to maintain the liquid in the form of a meniscus around said space.

It is of course possible to employ a coating mechanism wherein the coating element is moved instead of moving the glass sheet.

DESCRIPTION OF PREFERRED EMBODIMENTS

Figure 1:
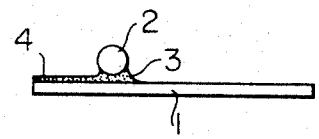
FIGS. 1 and 2 are schematic cross-sectional views of two coating elements with different cross-sectional configurations, meniscuses of coating liquid and glass sheets, showing the basic principle of the invention.
Figure 2:
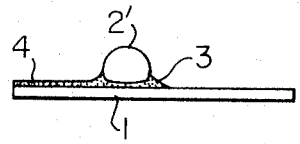

Two examples of the coating element are respectively shown in FIGS. 1 and 2.

In FIG. 1, a coating element 2 which is circular in cross-section is disposed in close proximity with the surface of a glass sheet 1 and a meniscus 3 of a coating liquid exists between said coating element and glass surface.

As the coating element 2 moves relative to and in parallel with the glass sheet 1, the meniscus 3 moves along the surface of said glass sheet, whereby a film 4 is produced on the glass surface.

The coating element may generally be circular or elliptical in cross-section, but as shown by numeral 2', for the purpose of maintaining a relatively large amount of the coating liquid in the form of a meniscus, it is under certain circumstances preferable to employ a coating element with a deformed-circular section, i.e., an element which provides a locally flat surface that faces the glass surface.

It is likewise possible to modify the liquid amount in the meniscus by employing a coating element which is so shaped that its peripheral surface facing the glass surface is either recessed or protrudes.

Where a coating element having a circular cross-section is employed, its outer diameter is related to the shape of the meniscus and the amount of liquid that will be held in said meniscus. Therefore, the thickness of the film that will be formed can be controlled by adjusting the outer diameter of the coating element.

With the other conditions being held constant, the larger the diameter of the coating element, the thinner will the film become. On the contrary, the smaller the diameter, the thicker the film.

Substantially the same tendency as above is observed with coating elements having other cross-sectional configurations. If an excess amount of the liquid is fed to the meniscus, the latter will not be able to retain its proper shape and the liquid will escape therefrom, often giving rise to an uneven film. It is, therefore, preferable that the liquid be supplied in an amount that will enable the meniscus to retain the proper shape.

When the glass sheet to be coated is curved, it is necessary that the coating element be a bar-like member bent in correspondence with the curved surface so that an even gap will be created between the glass surface and the corresponding surface of the coating element.

There is no special restriction on the material of which the coating element, and such materials as synthetic resin, rubber, sponge, metal, e.g., brass, steel, etc., glass, ceramics and the like may be utilized. Generally speaking, the greater the affinity (wettability) of the material for the coating liquid used, the thinner will the resulting film be. If the affinity is weak, the result will be the reverse. It is therefore preferable to select the proper material according to the type and properties of coating liquid.

So that the coating element will move relative to the glass surface, a suitable drive means is employed. If, during the relative movement, the coating element hits the glass surface by chance, the element will be vibrated to the detriment of the stability of the meniscus, with the result that the film being produced tends to lack the desired evenness. In some instances, the glass surface is damaged. It is for this reason necessary to avoid contact between the coating element and glass surface.

The gap to be maintained between the glass surface and the lowermost surface of the coating element, i.e., the surface which is closest to the glass, depends upon such factors as the type and properties of coating liquid used, the affinity of the coating element for the liquid, the shape of said element, relative speed of movement and the desired thickness of the film to be produced. In one example of this invention, where a solution of metallic compounds in an organic solvent is applied to a glass surface, it has been found appropriate to arrange the coating element so that the aforesaid gap will be about 2 millimeters or less and, preferably, about 0.5 to 1.5 millimeters.

There is no restriction, either, upon the system for moving said coating element and/or glass, and in order to obtain a uniform film on the glass surface, it is generally sufficient if the coating element and/or glass can be moved at a constant speed. In this instance, it is important to ensure that there will be maintained a constant gap between the coating element and glass surface and, at the same time, the vibration of the element will be minimized.

With other conditions being held constant, the higher the speed of relative movement between the coating element and glass, the thicker will the resulting film be. Conversely, as the speed drops, the film is reduced in thickness. Therefore, the speed of relative movement should depend upon said other conditions and the desired film thickness.

When it is desired to coat both sides of a glass sheet simultaneously, a coating element is disposed on both sides of the sheet.

Figure 3:
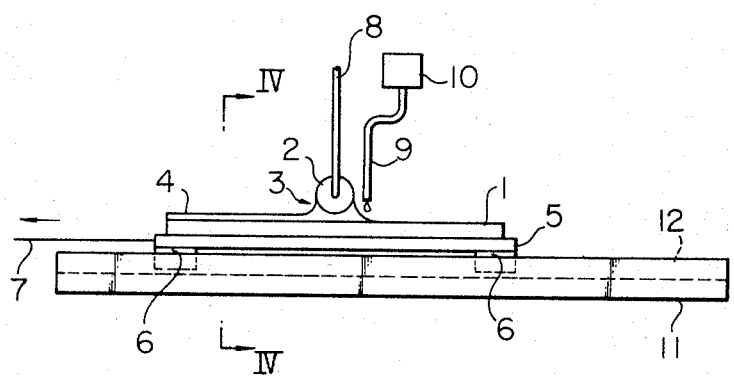
FIG. 3 is a side-elevational view showing, schematically, a simplified embodiment of a coating apparatus according to the invention.
Figure 4:
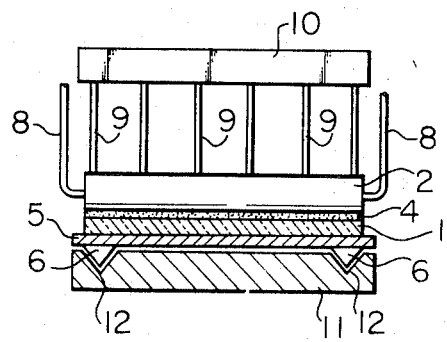
FIG. 4 is a sectional view taken along the line IV — IV of FIG. 3.

Referring to FIGS. 3 and 4, a glass sheet 1 rests on a carriage 5, and four sliding pieces 6, which are attached to the bottom of the carriage 5, are engaged within grooved tracks 12 which are formed in the upper surfaces of a rack 11. The sliding pieces 6 are made of a material which has a minimum of frictional resistance, e.g., polytetrafluoroethylene resin (Teflon). Lubricating oil is maintained in the groove-rail 12 for the purpose of reducing the friction between the tracks and said sliding pieces.

A pulling wire-rope 7 is attached to the front end of said glass carriage 5, with the free end of the rope 7 being connected to a pulling-drive source (not shown) which may be an electric motor.

At a distance from and upwardly of the glass sheet 1, a coating element 2 is supported by a supporting member 8 in such a manner that the element may be either raised or lowered as desired. Located rearwardly of the coating element 2 is a container 10 for the coating liquid, from which a feeding pipe 9, e.g., of synthetic resin, extends downwards, with the lower end of said pipe being spaced by a small clearance from a meniscus 3 of the liquid. The coating liquid trickles down from the lower end of the feeding pipe 9 in small metered installments to constantly replenish the meniscus 3.

The pulling wire-rope 7 is driven by said pulling-drive source at a speed of e.g., 5 to 100 cm/min. whereby the glass carriage 5 and the glass sheet 1 resting thereon are moved. This causes the meniscus 3 that lies between the glass sheet 1 and coating element 2 move along the surface of the sheet, thereby progressively producing a continuous film 4 on the glass surface.

Several modes of feeding the coating liquid to the meniscus will now be explained with reference to FIG. 5a through g.

Figure 5A:
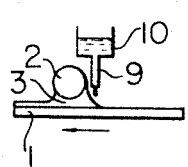
FIGS. 5a and 5g show schematic views which illustrate several different manners of feeding a coating liquid to the meniscus.

FIG. 5a shows the same mode of feeding as illustrated in FIGS. 3 and 4. In this example, the liquid drips from the container 10 onto the meniscus 3 through the supply pipe 9.

Figure 5B:
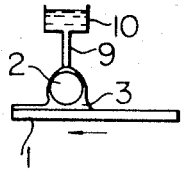

In FIG. 5b, the coating liquid is supplied to the top of the coating element 2, whence the liquid trickles along the surface of the element down onto the meniscus 3.

Figure 5C:
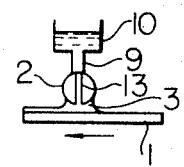

In FIG. 5c, the coating element 2 is provided with a slit 13 extending diametrically therethrough, with the liquid being allowed to flow through the slit onto the meniscus 3.

Figure 5D:
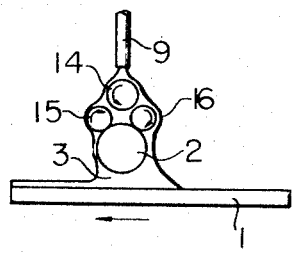

In the example illustrated in FIG. 5d, three auxiliary revolving rollers 14, 15 and 16 are located above the coating element 2, and the coating liquid trickles down the surfaces of those rollers to the element 2, whence it is further transferred to the meniscus 3.

Figure 5E:
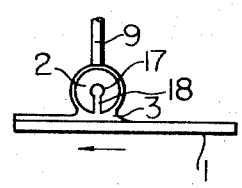

In FIG. 5e, the coating element 2 has an axially extending suction compartment 17 which communicates with the meniscus 3 through a radial slit 18 in the element. The shape of the meniscus 3 can be modified by adjusting the suction to be applied to the suction compartment 17.

Figure 5F:
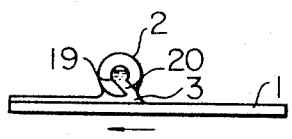

FIG. 5f shows still another example in which an axially extending liquid basin 19 is formed within the coating element 2 and the coating liquid is fed to the meniscus through a chordal feeding slit 20 slanting downwards. In this construction, as the size of the meniscus 3 is decreased to the extent that the liquid basin 19 is exposed to the atmosphere, the coating liquid automatically flows out to help the meniscus to restore its original shape.

Figure 5G:
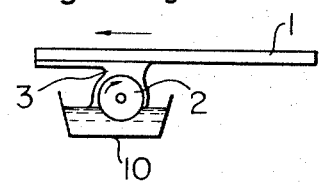

In FIG. 5g, the glass sheet 1 is positioned above the coating element 2 and the lower surface of the element 2 remains immersed in the coating liquid held in container 10. The coating element 2 is rotated so that the liquid will be carried up onto the meniscus 3.

The film produced according to this invention is then generally dried and/or baked. In this connection, it is preferable to install a heating means near the coating element so that it will dry and/or bake the film as soon as the latter is formed. As said heating means, use may be used of, for example, an infrared heater or a hot-air heater. The heater is located in the direction of the relative movement of the coating element and in series with said element.

Alternatively after coating, the glass may be transferred to a drying and/or baking furnace wherein it is dried and/or baked.

When a multi-layered film is produced on a glass surface using two or more coating liquids, the glass is first coated with a bottom liquid film, followed by drying or baking, and the glass so treated is then subjected to a similar process in which a second coating liquid is used to form a second layer which is then dried and/or baked in the same manner as above. The procedure can be repeated any number of times to obtain a multi-layered film. For better results, two or more sets of the coating element and heating means are employed in series so that the above-mentioned process may be repeated in succession on the line.

When it is desired to produce a film selectively on a localized area of the glass surface, as will hereinafter be described in detail, the coating element is moved in the axial direction, while the same element and/or glass is driven so that the meniscus will move along the selected area of glass surface.

When it is desired to produce films of different kinds on a glass surface in a predetermined pattern, a plurality of comparatively short coating elements are arranged in parallel or inter-connected so that the meniscuses composed of dissimilar coating liquids will move along the areas of glass surface previously selected for the respective liquids.

The method of the invention will now be described by the following examples wherein glass sheets were coated according to the method hereinbefore described.

In those examples, where a heat-reflecting film composed predominantly of titanium oxide ($TiO_2$) was baked onto a surface of a glass sheet, the method of this invention was applied to the coating step using a solution of the titanium compound in an organic solvent.

The solution was prepared by dissolving tetrabutyl titanate ($Ti(C_4H_9O)_4$) and a small amount of ethyl silicate ($Si(C_2H_5O)_4$) in a mixed alcoholic solvent which consisted, for the most part, of n-butanol and ethanol. The ingredients and their proportions are set forth below in Table I.

Table I

| Ingredients | Proportions |
|---|---|
| Tetrabutyl titanate | 20 ml. |
| Ethyl silicate | 0.5 |
| n-Butanol | 49 |
| Ethanol | 25 |
| $HNO_3$ | 2 |
| HCl | 0.5 |

The solution was applied to a surface of each flat glass sheet of the conventional sheet glass composition (30 × 30 × 0.3 cm) under the conditions given below. The glass so treated was allowed to stand at room temperature, whereby the solution on the glass was dried, and then baked at 700°C for 4 minutes, whereby the dried solution was baked onto the glass surface. The above procedure yielded a heat-reflecting film composed predominantly of said titanium oxide on the glass surface.

The coating operation was carried out with use of a coating apparatus of the type illustrated in FIGS. 3 and 4 and under conditions varying, as will be described below. After baking, each of the films formed under the various conditions as above was examined or measured for its condition, i.e., the homogeneity, thickness and reflecting color (interference color) of the film. The coating elements used were round bars of polyvinyl chloride (diameters: 20 mm, 30 mm, 40 mm and 50 mm), of brass (20 mm and 30 mm), and of glass (40 mm). Those bars were 35 cm in length. The speed of movement of the glass sheet was varied within the range of 5 cm/min. to 70 cm/min. The gap between the coating element and glass sheet was also varied within the range of 0.1 mm to 1.5 mm. The amount of the coating solution fed to the meniscus varied within the range of 0.02 ml/cm to 0.2 ml/cm, in terms of the amount of the solution fed per meter of the coating element.

The combinations of variable conditions are shown in Table II, and the states of the films obtained under those conditions are shown in Table III. Example numbers are common for both Tables II and III.

TABLE II.—COATING CONDITIONS

| Example number | Material of coating element | Diameter of coating element, mm. | Distance between coating element and glass surface, mm. | Transfer speed of glass sheet, cm./min. | Quantity of solution supplied, ml./cm. |
|---|---|---|---|---|---|
| 1 | Polyvinylchloride. | 30 | 1.0 | 15 | 0.05 |
| 2 | do | 30 | 1.0 | 15 | 0.10 |
| 3 | do | 30 | 1.0 | 15 | 0.15 |
| 4 | do | 30 | 0.5 | 16 | 0.05 |
| 5 | do | 30 | 0.5 | 24 | 0.05 |
| 6 | do | 30 | 0.5 | 44 | 0.05 |
| 7 | do | 30 | 0.5 | 66 | 0.05 |
| 8 | do | 30 | 0.1 | 15 | 0.05 |
| 9 | do | 30 | 0.5 | 15 | 0.05 |
| 10 | do | 30 | 1.0 | 15 | 0.05 |
| 11 | do | 30 | 1.5 | 15 | 0.05 |
| 12 | do | 30 | 1.5 | 15 | 0.05 |
| 13 | do | 20 | 0.5 | 15 | 0.05 |
| 14 | do | 30 | 0.5 | 15 | 0.05 |
| 15 | do | 40 | 0.5 | 15 | 0.05 |
| 16 | do | 50 | 0.5 | 15 | 0.05 |
| 17 | Brass | 20 | 0.5 | 15 | 0.05 |
| 18 | do | 30 | 0.5 | 15 | 0.05 |
| 19 | Glass | 40 | 0.5 | 15 | 0.05 |
| 20 | do | 40 | 0.5 | 15 | 0.10 |
| 21 | do | 40 | 1.0 | 15 | 0.05 |
| 22 | do | 40 | 1.0 | 15 | 0.10 |

TABLE III.—STATES OF FILMS AFTER BAKING

| Example number | Evenness of film | Reflecting color of film | Thickness of film, angstroms |
|---|---|---|---|
| 1 | Good | White | 540 |
| 2 | do | Yellow | 640 |
| 3 | do | Purple | 1,300 |
| 4 | do | White | 540 |
| 5 | do | Yellow | 630 |
| 6 | do | Red | 760 |
| 7 | A little uneven | Blue | 1,500 |
| 8 | Good | White | 540 |
| 9 | do | do | 540 |
| 10 | do | do | 540 |
| 11 | Bad (film is formed only partially) | do | 540 |
| 12 | Good | Yellow | 640 |
| 13 | do | do | 640 |
| 14 | do | White | 540 |
| 15 | do | do | 530 |
| 16 | do | do | 530 |
| 17 | do | do | 540 |
| 18 | do | do | 530 |
| 19 | do | do | 540 |
| 20 | A little uneven | Reddish purple | 1,300 |
| 21 | Good | White | 540 |
| 22 | A little uneven | Purple | 1,400 |

Based on the results of the above experiments, the following tendencies were observed as to the coating conditions.

1. As the amount of the solution being held in the meniscus is increased, the resulting film is greater in thickness (cf. Examples No. 1 to No. 3).
2. The thickness of the film gains with the increasing relative transfer speed of the coating element and glass. However, when its thickness is increased excessively, the film becomes somewhat uneven (cf. Examples No. 4 to No. 7).
3. The distance between the coating element and glass surface has no significant influence upon the thickness and evenness of the film as long as it is less than about 1.5 mm. (cf. Examples No. 8 to No. 12).
4. As the coating element is increased in diameter, the film thickness is decreased progressively and by small degrees. (cf. Examples No. 13 to No. 16).
5. As regards the material of which the coating element is constructed, there is a tendency toward increases in film thickness when round bars hardly wettable with coating solutions, i.e., those of polyvinyl chloride, are employed in contrast to bars of brass or glass.

Figure 6:
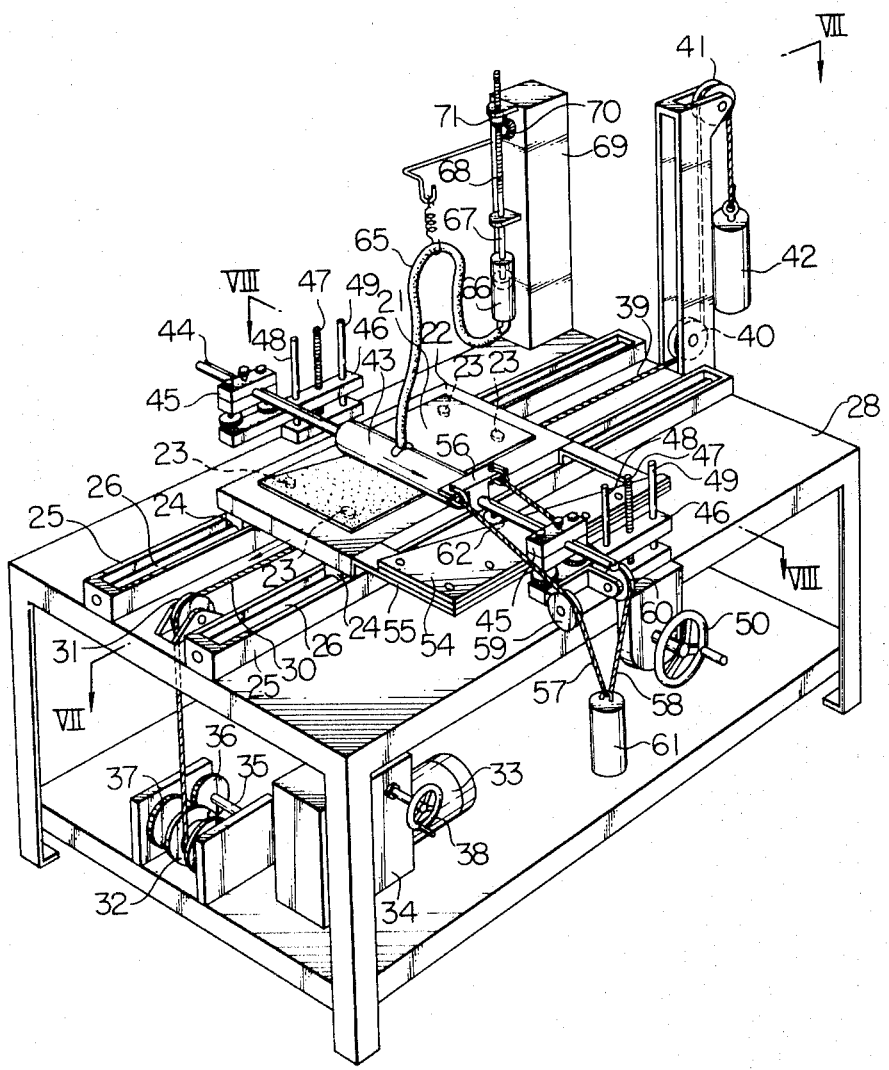
FIG. 6 is a perspective view showing another embodiment of a coating apparatus according to the invention.
Figure 7:
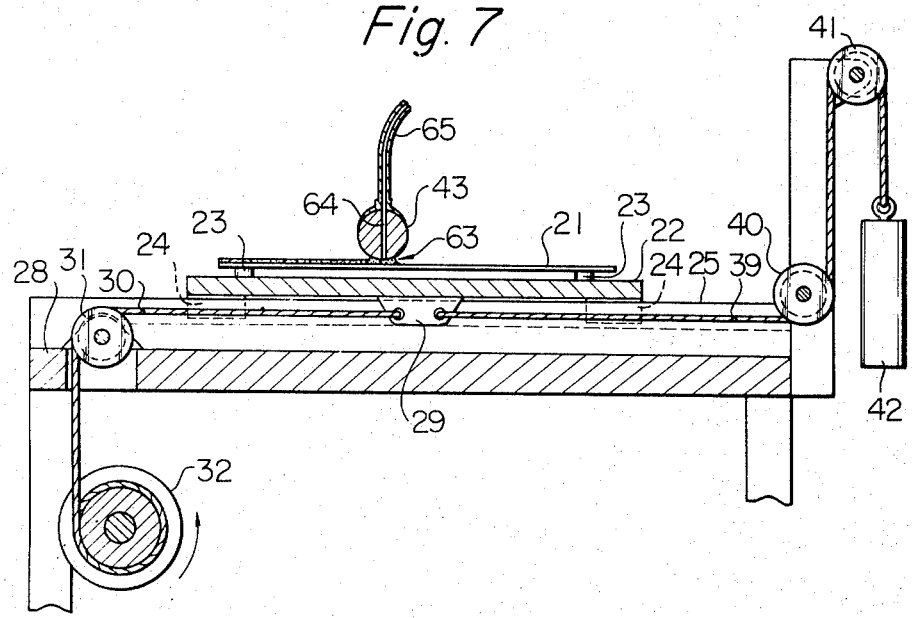
FIG. 7 is a sectional view taken along the line VII — VII of FIG. 6, showing a central longitudinal section of the apparatus.
Figure 8:
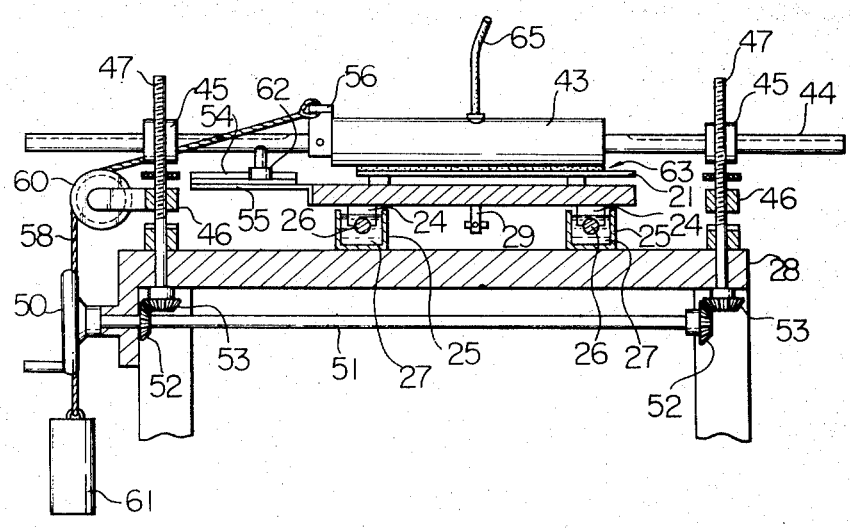
FIG. 8 is a sectional view taken along the line VIII — VIII of FIG. 6, showing a transverse section of the apparatus.

Now, an example of the coating apparatus according to this invention will be described by reference to FIGS. 6, 7 and 8.

A glass sheet 21 rests on four spacers 23 which are fixedly secured to a carriage 22. The spacers 23 are made of, for example, a flexible material such as rubber or synthetic resin and serve to support the glass sheet securely and in such a manner that the glass sheet will not be scratched or otherwise damaged.

Four sliding pieces 24 are attached to the bottom side of the carriage 22 and adapted to slide in and along the grooved tracks 25 which are disposed in mutually parallel relation on a rack 28. A guiding rail 26 is disposed within each track and, as shown in FIG. 8, engages the lower ends of the corresponding sliding pieces 24.

A lubricating oil 27 is maintained in the track 25 to reduce the friction between the sliding piece 24 and guiding rail 26.

A wire-rope 30, one end of which is secured to a wire-rope holder 29 attached centrally to the bottom side of the carriage 22, extends in the direction of movement of the carriage and after changing its course over a pulley 31 located at one end of the rack 28, reaches a take-up reel 32.

The carriage 22 is moved to the left as the wire-rope 30 is rewound by driving the take-up reel 32. The drive mechanism for rotating the reel 32 consists of an electric motor 33 and a reduction gear 34. The motor output is transmitted to the take up reel 32 through a gear 36 mounted on reduction gear shaft 35 and a gear 37 mounted coaxially with the take-up reel 32. The reduction gear 34 is provided with a hand wheel 38 with which the reduction gear ratio may be altered. A second wire-rope 39, which also is connected to the wire-rope holder 29, extends in the opposite direction with respect to the first-mentioned wire-rope 30 and after changing its course upwards over a pulley 40 located at the corresponding end of the rack 28, reaches a pulley 41 over which it changes its course downwards. A balancing weight 42 is attached to this other end of the wire-rope 39. In the above arrangement, when the carriage 22 is caused to slide, a sufficient force is at work in the opposite direction to guard against the possible lateral deflection and uneven traveling speed of the carriage.

A rod-shaped coating element 43 is located over the glass sheet 21 at a short distance from the upper surface of said sheet 21, extending in the direction perpendicular to the path of travel of the glass sheet. As will hereinafter be explained, a meniscus 63 of the coating liquid is maintained in this gap.

The coating element 43 has a shaft 44 which is supported by bearings 45 at both ends.

The mechanism for raising or lowering the coating element 43 will now be described. Each of the bearings 45 is bolted to a support plate 46, and a feed screw 47 extends upward through the threaded hole in support plate 46.

Two guide shafts 48 and 49 are fixedly secured to the rack 28, said shafts extending in parallel to the feed screw 47 through holes in the support plate provided on both sides of the screw 47.

As a wheel 50 is turned, the force is transmitted to the feed screw 47 through a straight bevel gear 52 mounted on a shaft 51 and a straight bevel gear 53 mounted on the lower end of the feed screw 47. With the revolution of the feed screw 47, the plate 46 and, therefore, the coating element 43 connected thereto, are raised or lowered. In this manner, the distance between the glass sheet 21 and coating element 43 can be readily adjusted as desired.

When the carriage 22 slides, the coating element 43 may be moved transversely, thereby limiting the film-forming area as desired.

A coating control plate 54 is fixedly mounted on a supporting bracket 55 which in turn, is fixedly secured to a lateral side of the carriage and extends laterally with respect to the carriage. The control plate 54 has an inner edge corresponding to the pattern of the area of glass surface 21 on which a film is to be formed. Two wire-ropes 57 and 58 are connected to a wire-rope holder 56 which is attached to the right-hand end of the coating element 43.

The wire-ropes 57, 58 are passed over pulleys 59 and 60, respectively, with the free ends of said wire-ropes being connected to a common weight 61. The coating element 43 is pulled by this weight in the transverse direction relative to the path of travel of the glass sheet.

The shaft 44 of coating element 43 carries a rotatable guide pin 62. The guide pin 62 is in contact with the inner edge of the control plate 54.

In the foregoing arrangement, as the carriage 22 slides, the coating element 43 travels transversely with respect to the carriage movement, as indicated by the arrow, and the area of glass sheet 21 corresponding to the inner edge of the control plate 54 is coated as the meniscus carried by the coating element moves along the area. When it is desired to coat the entire surface of the glass sheet 21, the coating element 43 is not moved transversely.

The coating liquid is fed into the gap between the coating element 43 and glass sheet 21, and the means for feeding the liquid in this way and maintaining the same in the form of a meniscus 63 will now be described. A slit 64 is formed through the coating element in such a manner that the coating liquid from a feeding pipe 65 located over the element and in communication with said slit flows down to the meniscus 63 through said slit 64. The feeding pipe 65 is connected, at the other end, to the delivery end of a storage tube 66 for the coating liquid. The coating liquid in the storage tube 66 is dispensed in small installments as a piston 67 is forced down by the downward movement of piston rod 68 which is provided with a straight bevel gear 71 engaged by another straight bevel gear 70 which is positioned perpendicularly with respect to the first-mentioned gear 71 and projects from housing 69 for the drive mechanism, e.g., an electric motor or gearing. The gear 71 has a threaded hole which is engageable with the external thread of the piston rod 68. So, as the revolution of the gear 70 is transmitted to the gear 71, the piston rod 68 moves gradually downwards, thereby feeding the coating liquid to the meniscus 63 at a predetermined rate. In this manner, the amount of coating liquid forming the meniscus is held constant.

At the start of coating, the carriage 22 is located in a backward (retracted) position. First, as the feeding means is actuated, the coating liquid reaches the lower surface of the coating element 43 and forms said meniscus 63. Then, by the revolution of the take-up reel 32, the carriage is caused to slide forward, as indicated by the arrow. Since the coating element 43 moves transversely in correspondence with the inner edge of the control plate 54 while the carriage slides forwards, the meniscus 63 moves along the area of glass sheet 21 corresponding to the inner edge of plate 54. A cycle of coating operation is complete when the carriage has completely passed beneath the coating element 43, and the coated glass sheet is withdrawn. By turning the take-up reel 32 slowly in reverse, the carriage 22 is reinstated to the original position. A second cycle of coating is carried out on another glass sheet after the latter is set in position on the carriage 22.

The coating apparatus described above offers the following advantages.
1. Since the glass sheet travels at a constant speed beneath the coating element, an even film is formed on the glass surface.
2. Since the coating element is moved transversely as dictated by the control plate, the film can be produced in a selected area of the glass sheet. It is of course possible to coat the entire surface.
3. The coating liquid is fed to the meniscus at a predetermined rate so that the shape of the meniscus is kept constant throughout the coating operation.

What is claimed is:

1. An apparatus for coating a sheet glass surface evenly with a coating liquid, comprising:
   a. a carriage for the glass sheet and sliding pieces on the bottom surface thereof;
   b. a track means guiding said sliding pieces;
   c. a drive means for causing the carriage to slide along said track means;
   d. a rod-shaped coating element disposed over and at a short distance from the upper surface of the glass sheet to define a gap therebetween, said element extending transversely with respect to the path of travel of said carriage;
   e. means for vertically moving the coating element in respect to the glass sheet surface; and
   f. a means for feeding a coating liquid to the gap between the said coating element and the upper surface of said glass sheet whereby the coating liquid is maintained in and around said gap in the form of a meniscus, said liquid feeding means comprising a container for the coating liquid, a piston means for forcing the liquid out of the container in metered amounts, and a piping means for guiding the coating liquid from said container to the meniscus.

2. An apparatus according to claim 1, said drive means comprising a flexible elongated element one end of which is secured to said carriage and a reel for winding up the other end of the elongated element, and a drive mechanism for rotating the reel, the elongated element extending in the direction of travel of the carriage for causing the carriage to slide along the track means as the elongated element is wound up on the reel.

3. An apparatus according to claim 2, wherein a second flexible elongated element is attached to said carriage, said second flexible elongated element extending in the opposite direction with respect to the direction of travel of said carriage, and a weight is attached to the free end of the second elongated element.

4. An apparatus according to claim 1, wherein the track means are grooved tracks, a guide rail is disposed in each track and engaged by said sliding pieces, and a lubricating oil is maintained in said grooved tracks.

5. An apparatus according to claim 1, wherein the coating element is mounted on a shaft, and the means for vertically moving the coating element comprises shaft bearings, a support plate for each of said shaft bearings a rotatable feed screw extending through a threaded hole in each support plate, guide shafts extending through holes in each guiding plate on both sides of the threaded hole thereof and parallel to said feed screw, and means for rotating the feed screw, thereby raising or lowering the support plate and the coating element connected thereto.

6. An apparatus according to claim 1, additionally including a means for moving the coating element transversly to the movement of the carriage, comprising a control plate extending laterally of said carriage and parallel thereto, the control plate being fixedly secured to said carriage and having a camming edge extending obliquely to the lateral edge of the carriage, a rotatable guide pin attached to the coating element and adapted to engage with the camming edge of said control plate, a flexible elongated element fixedly secured to said coating element, and a weight attached to the free end of said elongated element, said elongated element being adapted to pull the coating element transversely with respect to the path of travel of said carriage whereby the coating element is moved transversely according to the contour of said camming edge while the carriage slides.

* * * * *